United States Patent
Tamizkar

(10) Patent No.: US 11,502,938 B2
(45) Date of Patent: Nov. 15, 2022

(54) METHOD AND SYSTEM FOR SWITCHING DATA FRAMES IN A NETWORK

(71) Applicant: Telia Company AB, Solna (SE)

(72) Inventor: Babak Tamizkar, Stockholm (SE)

(73) Assignee: TELIA COMPANY AB

( * ) Notice: Subject to any disclaimer, the term of this patent is extended or adjusted under 35 U.S.C. 154(b) by 79 days.

(21) Appl. No.: 17/154,263

(22) Filed: Jan. 21, 2021

(65) Prior Publication Data

US 2021/0234792 A1    Jul. 29, 2021

(30) Foreign Application Priority Data

Jan. 22, 2020    (SE) .................................. 2050048-4

(51) Int. Cl.
| | | |
|---|---|---|
| *H04L 12/733* | (2013.01) | |
| *H04L 45/00* | (2022.01) | |
| *H04L 12/46* | (2006.01) | |
| *H04L 45/74* | (2022.01) | |
| *H04L 101/622* | (2022.01) | |

(52) U.S. Cl.
CPC .......... *H04L 45/20* (2013.01); *H04L 12/4641* (2013.01); *H04L 45/66* (2013.01); *H04L 45/74* (2013.01); *H04L 2101/622* (2022.05)

(58) Field of Classification Search
CPC ..... H04L 45/20; H04L 12/4641; H04L 45/66; H04L 45/74; H04L 2101/622; H04L 45/12; H04L 45/745; H04L 45/18; H04L 12/18; H04L 63/123; H04L 12/4633
See application file for complete search history.

(56) References Cited

U.S. PATENT DOCUMENTS

| | | | |
|---|---|---|---|
| 6,493,318 B1 | 12/2002 | Bare | |
| 2004/0047353 A1* | 3/2004 | Umayabashi | H04L 12/18 370/395.63 |
| 2005/0063396 A1* | 3/2005 | Yu | H04J 3/085 370/401 |

(Continued)

FOREIGN PATENT DOCUMENTS

WO    WO 2006047223 A2    5/2006

OTHER PUBLICATIONS

Extened European Search Report dated Jun. 17, 2021, issued by the European Patent Office for Application No. 21152838.5-1215.

(Continued)

*Primary Examiner* — Wutchung Chu
(74) *Attorney, Agent, or Firm* — Burr & Forman LLP; Jeffrey H. Kamenetsky

(57) ABSTRACT

The embodiments herein relate to a method and a system for switch data frames in a network comprising a plurality of switch devices. The method comprising: assigning to each switch device, a SW-ID, exchanging SW-IDs between switch devices; building a routing table, for each switch device; receiving a frame at a switch device. If the frame is a broadcast frame, generating separate copies of the frame; modifying a destination MAC address of each generated copy of the frame by including in the destination MAC address an indicator value; and further including the SW-ID of a corresponding switch device and based on the routing table and the cost indicating in the routing table, transmitting or forwarding each modified frame towards the switch device having the SW-ID indicated in the frame.

12 Claims, 4 Drawing Sheets

(56) References Cited

U.S. PATENT DOCUMENTS

| | | | | |
|---|---|---|---|---|
| 2006/0224659 A1* | 10/2006 | Yu | ................ | H04L 12/437 709/201 |
| 2006/0291480 A1* | 12/2006 | Cho | ................ | H04L 45/02 370/397 |
| 2008/0205385 A1* | 8/2008 | Zeng | ................ | H04L 45/00 370/389 |
| 2008/0316918 A1* | 12/2008 | Sakauchi | ................ | H04L 12/437 370/223 |
| 2008/0317030 A1 | 12/2008 | Rhee et al. | | |
| 2010/0226377 A1* | 9/2010 | Ogasahara | ................ | H04L 45/00 370/400 |
| 2011/0317703 A1 | 12/2011 | Dunbar et al. | | |
| 2012/0307826 A1* | 12/2012 | Matsuoka | ................ | H04L 49/70 370/390 |
| 2013/0003601 A1* | 1/2013 | Gupta | ................ | H04L 45/18 370/254 |
| 2013/0170504 A1* | 7/2013 | Shimokawa | ................ | H04L 45/18 370/429 |
| 2013/0336317 A1* | 12/2013 | Mithyantha | ................ | H04L 45/18 370/390 |
| 2015/0131674 A1* | 5/2015 | Kao | ................ | H04L 61/2596 370/420 |
| 2016/0173296 A1* | 6/2016 | Ooi | ................ | H04L 45/18 370/224 |
| 2017/0048154 A1* | 2/2017 | Fung | ................ | H04L 49/25 |
| 2019/0173782 A1* | 6/2019 | Soliman | ................ | H04L 45/48 |
| 2020/0313936 A1* | 10/2020 | Kaku | ................ | H04L 25/20 |
| 2021/0399959 A1* | 12/2021 | Barry | ................ | H04L 43/04 |

OTHER PUBLICATIONS

Marian Klas: "Cisco FabricPath Technology Introduction", Dec. 31, 2011, pp. 1-25, XP055645978, retrieved from the Internet: htpps://www.cisco.com/c/dam/global/sk_sk/assets/expo2011/pdfs/Cisco_FabricPath_Marian_Klas.pdf [retrieved on Nov. 25, 2019].

Office Action and Search Report, Application No. 2050048-4, dated Dec. 2, 2020, Swedish Patent and Registration Office, Stockholm, Sweden.

Cisco FabricPath Technology Introduction, by Marian Klas, 2011, Cisco Systems, Inc., pp. 1-25.

* cited by examiner

METHOD AND SYSTEM FOR SWITCHING DATA FRAMES IN A NETWORK

TECHNICAL FIELD

The present disclosure relates to the field of data communications, and in particular to a method, and a system for switching data frames in a network.

BACKGROUND

Switching is an approach of delivering data frames across the network. Switching methods decide how a switch device receives, processes, and forwards the frames. A hub device and a repeater device work at Layer 1 (Physical Layer). These devices only understand the signals. Signals received on an incoming port are forwarded from all available ports.

A switch device works at the Layer 2 (Data Link Layer) of the OSI model. A switch is capable to read frames. Switching is a method of dealing with frames. When a data frame enters a port of the switch device, the switch device checks the FCS (Frame checksum sequence) field of the data frame and processes it only if it is valid. All invalided data frames are automatically dropped or discarded. All valid data frames are processed and forwarded to their destination MAC (Medium Access Control) address.

A switch device performs three main tasks:
learn where devices are located and store their location (addresses) in a MAC table.
Forward a frame intelligently based on the MAC address of a data frame.
remove layer 2 loops.

A challenge in switching technology is "loop prevention." Having a loop in L2 domain may cause a severe issue and bring down the network quickly. There are three main issues when there is a loop in a L2 network:
1) Broadcast/Unknown-unicast storm
2) Frame duplication
3) MAC address table corruption In order to understand why a L2 loop can cause issues, below is a description on how a switch operates. The standard procedure in switching technology includes:

A) When a switch device receives a data frame, it looks/checks at the L2 part of the frame which includes a source address and a destination MAC address.
B) The switch device has a MAC Address table that includes the MAC address of a node and a local port on the switch device to reach to that node being directly or indirectly connected to the switch device.
C) When the switch device receives a data frame, it looks at the source MAC address field of that frame before it sends the frame out. Then the switch device inserts the source MAC address and the receiver port's number into its MAC address table if it is not already inserted.
D) If the switch device receives a broadcast frame, regardless of the source of that data frame, the switch device floods that frame on all its ports except the port from which the frame arrived.
E) If the switch device receives a data frame and there is no entry in its MAC address table for the destination (Unknown-unicast), the switch device floods that frame on all its ports except the port which the frame arrived, regardless of the source of that frame. This frame is known as an unknown-unicast frame.
F) Based on the model of the switch device, the MAC address table of the switch has a limitation on how many entries it can store. If the switch's MAC address tables become full, the switch starts to replace the new entries with the top old ones.
G) Based on the model of the switch device, the switch's MAC address table entries have an "aging time", i.e., for how long entries are stored in the MAC table. This means that if there is no update for an entry, for a defined time, the switch device removes the entry from its MAC address table. An example of an aging time is 5 minutes.
H) When reloading or restarting or resetting a switch device, the switch MAC address table is flushed.

In view of the above, if a loop occurs in the network, a broadcast frame or an unknown-unicast frame can be regenerated and forwarded forever in a L2 domain. This is known as a storm which immediately brings the network down because either the link's bandwidth gets full or the switch device is unable to process such an unlimited and growing number of data frames.

In addition, a loop may cause two other issues:
A single data frame may reach to a destination two times or more. This is called Frame duplication.
A switch device may have to change continuously an entry for a specific node in its MAC address table. This is called MAC address table corruption.

To better visualize the loop issues as explained above, FIG. 1 illustrates an example of a network topology including three switch devices, denoted SW-A 101, SW-B 102, and SW-C 103. The figure also depicts three host nodes N-X 104, N-Y 105 and N-Z 106, each connected to respective switch device. N-X 104 is connected to SW-A 101, N-Y 105 is connected to SW-B 102 and N-Z 106 is connected to SW-C 103. A host node may be a server, a personal computer, a laptop or any suitable host node. In this example, each switch is provided with 3 ports. For example, SW-A 101 is provided with port 8 for receiving and sending data frame to host node N-X 104. SW-A 101 is provided with two additional ports port 1 and port 2. Port 1 is used towards SW-C and port 2 is used towards SW-B 102.

Assuming now that host node N-X 104 sends out an ARP (Address resolution Protocol) request in order to fetch the MAC address of another host node/device, e.g., of host node N-Z 106 which is shown connected to SW-C 103. An ARP request is a type of a broadcast frame. SW-A 101 receives the ARP request from N-X 104 and the following occurs:

a) Switch SW-A 101 floods the broadcast data frame on all its ports except the coming one which is port-8. Hence two data frames are generated by SW-A 101 and sent out. One broadcast frame from port 1 (towards SW-C 103) and one broadcast frame from port 2 (towards SW-B 102).
b) Switch devices SW-B 102 and SW-C 103 each receive the broadcast frame and since this is a broadcast frame they do the same, which means that SW-B 102 floods the frame on its port 1 and its port-8 and SW-C 103 floods the frame on its port 2 and its port-8. So, SW-C 103 receives the frame from SW-B 102 and SW-C 103 receives the frame from SW-B 102.
c) Now again SW-B 102 and SW-C 103 flood that frame to SW-A 101.

As clear from above this flooding is repeated continually. Flooding means sending the frame.

It should be noted that even if node N-X 104 knows the MAC address of N-Z 106 and sends a unicast frame to SW-A 101 intended for N-Z 106 and if SW-A 101 has no entry for N-Z 106 in its MAC address table, this unicast frame is considered as an unknown-unicast frame to switch SW-A 101. So, the switch floods it like a broadcast frame.

There are two standard well-known protocols to address switching loop issues, STP and TRILL which both deal with loop prevention.

1. Physically Loop Prevention by STP (Spanning Tree Protocol)

The idea behind STP is very straightforward. It detects the loop by exchanging some special frames called Bridge Protocol Data Unit (BPDU) frames and switch IDs between switch devices. BPDUs include information about STP.

For STP to function, the switch devices need to share information about themselves and their connections. What they share are BPDUs. BPDUs are sent out as multicast frames to which only other Layer 2 switches (or bridges) are listening. If any loops (multiple possible paths between switches) are found in the network topology, the switches will co-operate to disable a port or ports to ensure that there are no loops; that is, from one device to any other device in the layer 2 network, only one path can be taken.

STP works well but it has some drawbacks which include:
- As STP blocks as many ports as possible to make the domain loop free, the network topology loses some part of the operational and valuable bandwidth. For instance, in our example, STP has to disable at least one link to prevent a loop. In this case one out of three links gets disabled which means losing about 33% of the bandwidth and network capacity. FIG. 2 illustrates this scenario where the link between port 1 of SW-A 101 and port 1 of SW-C 103 is disabled.
- Since STP has to block one or more links to make the domain loop free, there is no guaranty that frames take the shortest path from a source to a destination. For instance, in the example of FIG. 2, if a frame needs to reach from N-X 104 to N-Z 106, the frame has to pass this long path:
  N-X→SW-A→SW-B→SW-C→N-Z
  While there is a shorter path:
  N-X→SW-A→SW-C→N-Z which is shown blocked/disable by STP in order to prevent the loop.
- Because STP physically makes the domain loop free, there is only one single path from a source to a destination. Due to that there is no load balancing in an STP domain.
- The convergence time in STP is long. This means that it is very slow to react if any link failure occurs. For example, if one of the active ports in an STP domain goes down, around 30 seconds to 1 minute may elapse until an alternative port gets up and make the network operational again. So, in this case there is no service for about 1 minute which is not acceptable. This is called a "Freezing Period".
- STP doesn't require manual configuration by a user to work, however in real production networks, STP can get very complicated and useless. Hence, users may be required to perform manual configuration and change or apply additional STP features such as Root Bridge ID, BPDU Guard, BPDU Filter, Port Fast, Uplink Fast, Backbone Fast, Root Guard, Loop Guard, and so on to achieve better benefits of STP.

2. Logically Loop Prevention by TRILL (TRansparent Interconnection of Lots of Links)

In comparison with STP, TRILL operates more efficiently. For instance, in TRILL all available links are active and operational and because of that there is no waiting time in services if any port goes down. TRILL also supports EMCP (equal-cost Multi-path) routing. However, TRILL also have at least one the following drawback:

TRILL is an encapsulation (tunneling) method. So each frame needs to be encapsulated using a TRILL header in order to travel along the network. It means longer data frame size and more overhead for bandwidth and switching process, and also TRILL requires a special type of a switch to support this.

In view of the above, there is need for a new method, and a system for switching data frames in order to solve at least some of the problems described above.

SUMMARY

It is an object of embodiments herein to solve the above problems by providing a method and a system for switching data frames in a network.

According to an aspect of embodiments herein, there is provided a method in a network comprising a plurality of switch devices, the method comprising: assigning to each switch device, a unique switch-identification number (SW-ID); exchanging each SW-ID between all switch devices; building, for each switch device, a routing table based on said received SW-IDs, so that switch devices can reach each other; wherein each entry in the routing table includes an assigned SW-ID of a switch device, a dedicated port number and a cost to reach the switch device; receiving at a source switch device, a data frame, from a source host device connected to the source switch device, wherein the data frame includes a source MAC address of the source host device and a destination MAC address; if the data frame is a broadcast frame, the method comprises: generating separate copies of the broadcast data frame, one data frame for each switch device indicated in the routing table by a SW-ID; modifying the destination MAC address of each generated data frame by including in a first part of the destination MAC address an indicator value; and for each switch device indicated in the routing table, including in a second part of the destination MAC address, the SW-ID of the corresponding switch device; and based on the routing table of the source switch device and the cost indicated in the routing table, transmitting each modified data frame towards the switch device having the SW-ID indicated in the second part of the destination MAC address.

According to an embodiment, the second part of the destination MAC address further comprises a flag indicating the type of the received data frame and further comprises a Time-To-Live (TTL) field value. According to an embodiment, when a modified data frame is received by another switch device and if the indicator value is included in the destination MAC address of the received data frame, the method comprises: checking the TTL field value in the received data frame; and if the TTL field value is equal zero, discarding the received data frame; otherwise, if the TTL field value differs from zero: if the SW-ID in the received data frame is different from the SW-ID assigned to the switch device, determining from the routing table of the switch device, the port number associated with the destination switch device; decreasing the TTL filed value by a predetermined number; recalculating the FCS; replacing the FCS value of the data frame with the recalculated FCS; and transmitting the data frame towards the destination switch device.

According to an embodiment, when the data frame is received at the destination switch device with an assigned SW-ID equal to the SW-ID indicated in the data frame; replacing the modified destination MAC address with a standard broadcast MAC address; recalculating and updating the FCS; and forwarding the data frame only to access switch ports of the destination switch device.

According to an embodiment, if a switch device receives a unicast data frame through a port of the switch device having a port number, and if a destination MAC address in the received data frame is not present in a MAC address table of the switch device, the method comprising: selecting, from the routing table, to which switch devices to send the data frame, except to the switch devices associated with a port number indicated in the routing table as being equal to the port number of the port through which the data frame was received; generating separate copies of data frames, one data frame for each selected switch device; modifying the destination MAC address of each generated data frame by including in a first part of the destination MAC address an indicator value; including in a second part of the destination MAC address, the SW-ID of the corresponding selected switch device; and based on the routing table of the switch device and the cost indicated in the routing table, transmitting each modified data frame towards the switch device having the SW-ID indicated in the second part of the destination MAC address.

According to an embodiment, the method comprises: receiving the modified data frame at a selected switch device: if the SW-ID assigned to the selected switch device is equal to the SW-ID indicated in the data frame; checking a TTL field value in the received data frame; and if the TTL field value is equal zero, discarding the received data frame; otherwise; if the TTL field value differs from zero, replacing the modified destination MAC address with a standard broadcast MAC address; recalculating the FCS; replacing the FCS value of the data frame with the recalculated FCS; and transmitting the data frame only to access switch ports of the switch device.

According to an embodiment, if the SW-ID in the received data frame is different from the SW-ID assigned to the selected switch device, determining from the routing table of the selected switch device the port number associated with the destination switch device; decreasing the TTL filed value by a predetermined number; recalculating the FCS; replacing the FCS value of the data frame with the recalculated FCS; and transmitting the data frame towards the destination switch device.

According to another aspect of embodiments herein, there is provided a system that is configured to perform each of the method steps provided above.

An advantage with the embodiments herein is that there is no need to disable any link between switch devices and hence all links are up and operational. Further, a freezing period is no longer needed.

Another advantage with the embodiments herein is that data frames use the best path to reach a destination from a source. In addition, the method and system herein works in complex networks (such as a data center) as well as in simple networks. Manual configuration by a user can be eliminated.

Yet another advantage with the embodiments herein is that encapsulation or tunneling of data frames is not required.

Additional advantages achieved by the embodiments herein will become apparent from the following detailed description when considered in conjunction with the accompanying drawings.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Hereinafter, is described, according to embodiments herein, a new method switching for data frames in a network. The method may be referred to as a MFSP (Modified Frame Switching Protocol). This is because data frames are modified. Decisions taken by switch devices are based on rules as will be explained.

The following terminology is used herein:

MFSP switch: a switch device that uses the methods herein to receive and forward a frame.

MFSP domain: a network domain including MFSP switch devices and wherein the switch devices are connected to each other or via other MFSP switch devices in a Layer 2 network. A Layer 2 domain is a network where no routers are used to connect switch devices.

MFSP switch port: a port of a switch device receiving or sending a data frame from/to another MFSP switch device. For example, in FIG. 3, port 1, port 2 and port 3 of switch devices SW-A 301 are MFSP switch ports.

Switch access ports or access switch ports: ports of a MFSP switch device which are not connected to other MFSP switch devices. For instance, port 8 of SW-A 301 is a switch access port since it is connected to a Host-X.

Figure 1:
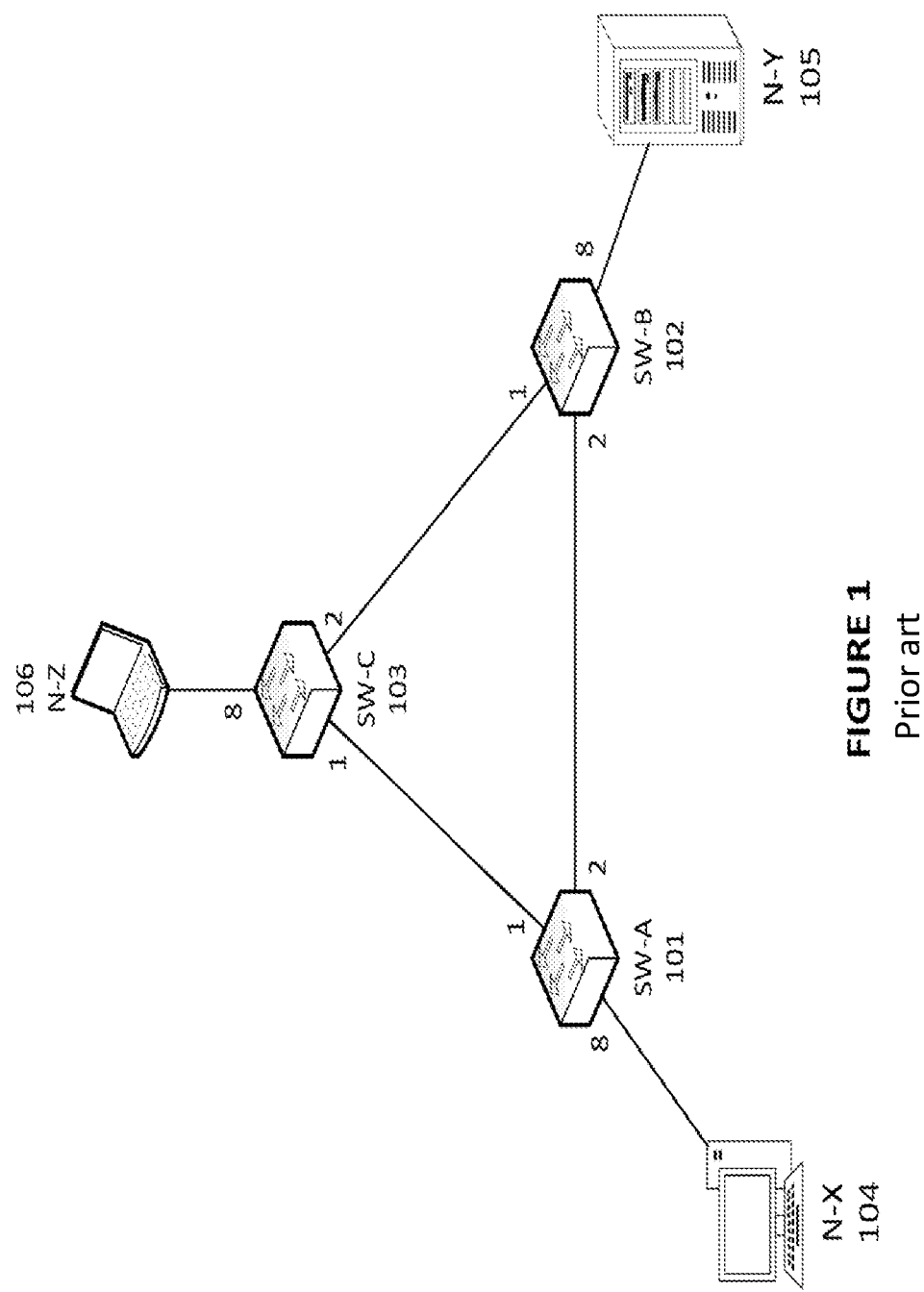
FIG. 1 is an example of a network topology comprising three switch devices.
Figure 2:
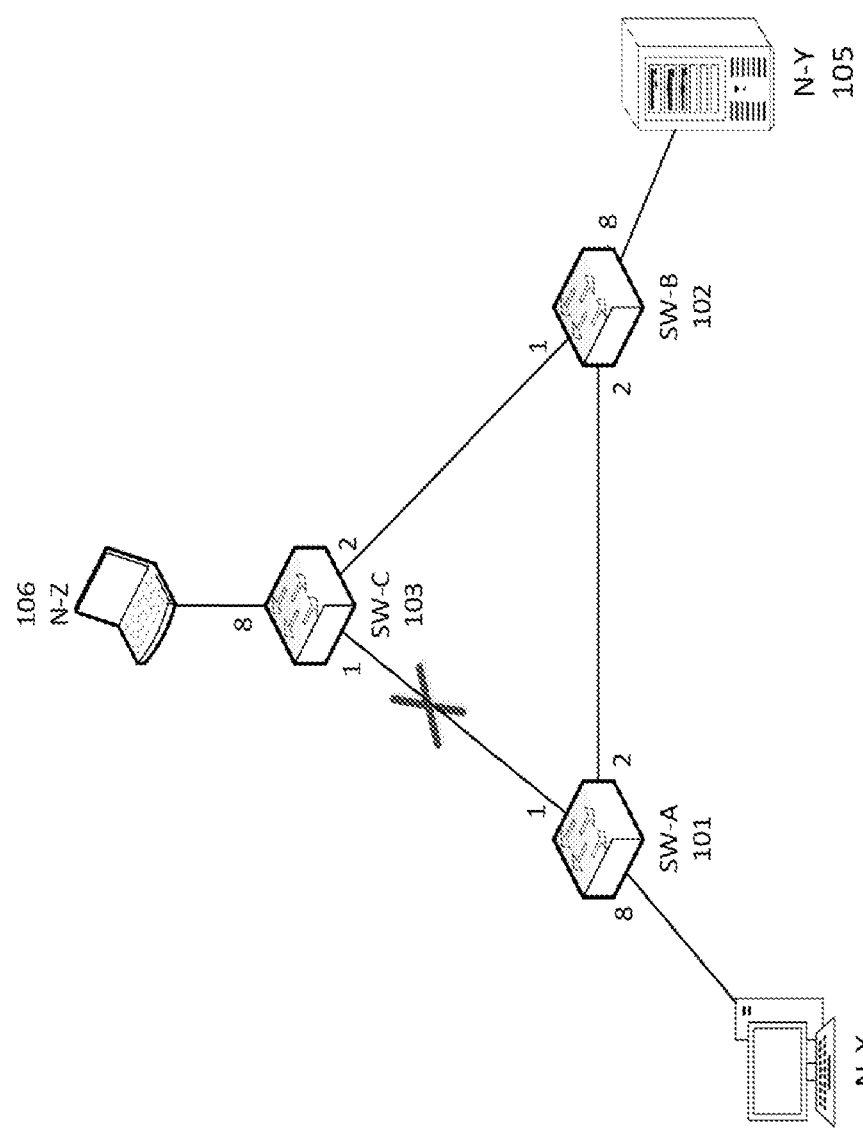
FIG. 2 is an example of the network topology of FIG. 1 wherein a link is disabled using STP for preventing loops.
Figure 3:
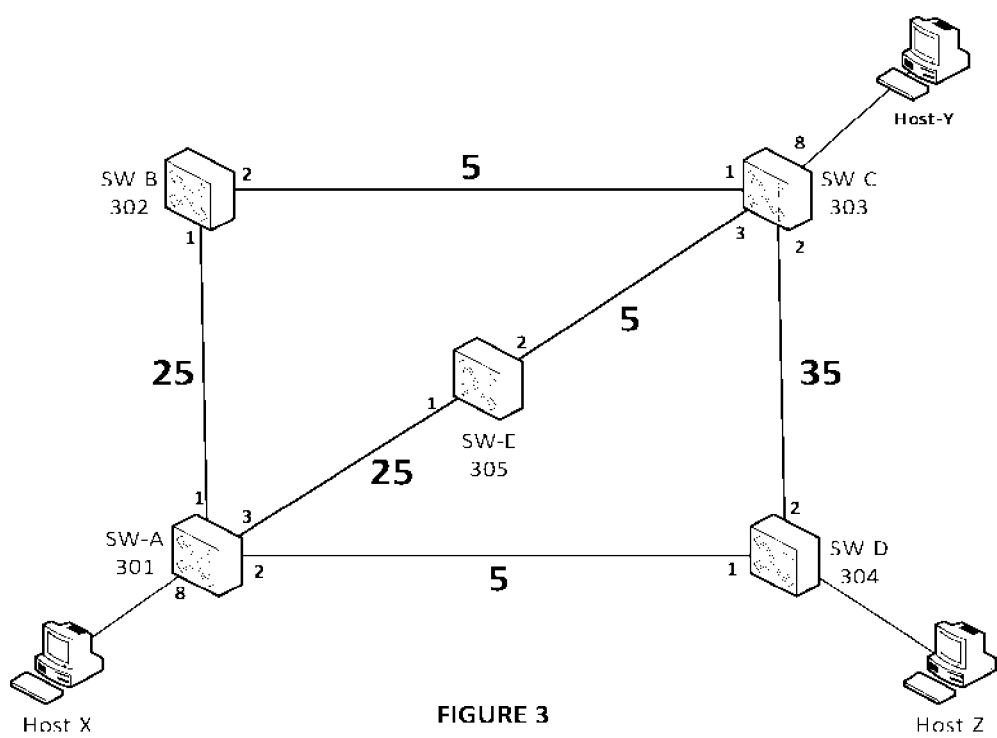
FIG. 3 is an example of a network topology wherein embodiments of the present invention may be employed.

SW-ID: a unique switch identification number assigned to a switch device. In FIG. 3, SW-A is the SW-ID of switch device A 301, SW-B is the SW-ID of switch device B 302, SW-C is the SW-ID of switch device C 303, etc.

Source host: a host device or a host node that is directly connected to a MFSP switch device and that is capable of generating and sending data frames to the MFSP switch device. For example, Host-X may be a source host.

Destination host: a host device or a host node that receives a frame from its directly connected MFSP switch. For example, Host-Y may be a destination host.

Source switch: the MFSP switch device that receives a frame from a source host for delivering to a destination host.

Destination switch: the MFSP switch device connected to a destination host.

Transit Switch: Any switch device between a source switch and a destination switch, and through which the frame passes.

Broadcast frame: A frame with FF:FF:FF:FF:FF:FF in its destination MAC address field. This address doesn't refer to a specific host. Such frame needs to be delivered to all host nodes in the L2 domain.

Unicast frame: A frame whose source and destination MAC address point to at least one specific host in the L2 network.

Known-Unicast frame: This is a unicast frame and the switch device receiving this frame has an entry in its MAC address table for the destination MAC address.

Unknown-Unicast frame: This is a unicast frame but a switch receiving this frame doesn't have an entry in its MAC address table for the destination MAC address.

ECMP (Equal-cost multi-path routing): allows for traffic of the same session, or flow or data frame—that is, traffic with the same source and destination—to be transmitted across multiple paths of equal cost.

The MFSP method according to some embodiments herein may be viewed as a protocol that runs over a L2 network domain comprising a plurality of switch devices. MFSP can handle any type of frames such as a broadcast frame, a multicast frame, a unicast frame, etc. MFSP also supports ECMP to send a frame from a source to a destination via different paths.

According to the method, each switch device is assigned a unique switch-identification number or SW-ID. This may be assigned by the switch device itself. If ECMP supports a routing protocol like IS-IS, ECMP may be run over the network to make the best path routing table between the switch devices. According to an embodiment, when a frame receives a new data frame, based on the type of the frame, the switch device is configured to make a decision on how to process the frame. For example, for a broadcast frame and an unknown-unicast frame, the switch device is configured to modify the destination MAC address field of the frame and the switch device is configured to take a decision on which port the frame should be sent out. For known-unicast frames, the switch device is configured to forward the frame from one of its ports selected based on the MAC address table.

It should be mentioned that in the method according to embodiments herein, the standard frame size and structure are used with no additional fields. However, and according to embodiments herein, the destination MAC address field is modified as will be explained. This process is transparent for any host node.

In the following, a more detailed overview of the method based on MFSP will be described in accordance with some embodiments herein followed by an example applying the principles of the present invention in a network topology such as the one shown in FIG. 3.

1. Assigning Switch-ID

Each switch device has a switch-ID (SW-ID) assigned and is unique for the switch. The assignment may be done automatically by the switch or manually by a user. For example and with reference to FIG. 3, switch device A 301 is assigned SW-A as SW-ID; switch device B 302 is assigned SW-B as SW-ID; switch device C 303 is assigned SW-C as SW-ID; switch device D 304 is assigned SW-D as SW-ID and switch device E 305 is assigned SW-E as SW-ID.

Further, the switch devices exchange their SW-ID with other switch devices.

2. Creating R-Table (Routing Table)

As previously described, each switch device has its unique SW-ID. Each switch device in the network topology is configured to exchange its SW-ID to all other switch devices. Hence, an exchange of each SW-ID is performed between all the switch devices. This is used to build or create a R-Table. This may be performed by a distance vector routing protocol, such as RIP (Routing Information Protocol), or any other suitable routing protocol. After this phase, every single switch device in the MFSP domain will have its own R-Table. For example, based on the topology shown in FIG. 3, the R-Table for switch device A 301 having SW-ID=SW-A is as shown below:

| Routing Table of switch 301 (SW-A) | | |
|---|---|---|
| Destination SW-ID (Alias) | Port | Cost |
| 302 (SW-B) | 1 | 25 |
| 303 (SW-C) | 1 | 30 |
| | 3 | 30 |
| 304 (SW-D) | 2 | 5 |
| 305 (SW-E) | 3 | 25 |

The first entry (first row) in the R-Table of switch device SW-A 301 is associated with a switch device that is connected to SW-A 301, which is switch device B 302, having SW-ID=SW-B that is assigned to switch device B. This entry also includes a dedicated port number (port 1) of switch device A 301 for reaching switch device SW-B 302, and the cost to reach switch device SW-B 302, which is 25 in FIG. 3.

Hence, if a data frame on SW-A 301 wants to reach to SW-B 302, the best path is through port 1 (MFSP port 1) and the cost is 25. The best path from a source switch to a destination switch hence is included in the R-table. It should be mentioned that the MFSP method is able to have more than one path indicated in the routing table. This is the case, for example, when there are two or more paths with equal cost from a source switch to a destination switch. As shown in the R-table of switch device SW-A 301, there are two paths from SW-A 301 to SW-C 303 with equal cost 30. One path through port 1 and another path through port 3. Note that through port 2, the cost is 40 (5+35) via SW-D, but this is not included in the R-table because the cost is not the best one.

The routing tables for the other switch devices SW-B 302-SW-E 305 are presented below:

| Routing Table of switch 302 (SW-B) | | |
|---|---|---|
| Destination SW-ID (Alias) | Port | Cost |
| 301 (SW-A) | 1 | 25 |
| 303 (SW-C) | 2 | 5 |
| 304 (SW-D) | 1 | 30 |
| 305 (SW-E) | 2 | 10 |

| Routing Table of switch 303 (SW-C) | | |
|---|---|---|
| Destination SW-ID (Alias) | Port | Cost |
| 302 (SW-B) | 1 | 5 |
| 301 (SW-A) | 1 | 30 |
| | 3 | 30 |
| 304 (SW-D) | 2 | 35 |
| 305 (SW-E) | 3 | 5 |

| Routing Table switch 304 (SW-D) | | |
|---|---|---|
| Destination SW-ID (Alias) | Port | Cost |
| 302 (SW-B) | 1 | 30 |
| 303 (SW-C) | 2 | 35 |
| 301 (SW-A) | 1 | 5 |
| 305 (SW-E) | 1 | 30 |

| Routing Table switch 305 (SW-E) | | |
|---|---|---|
| Destination SW-ID (Alias) | Port | Cost |
| 302 (SW-B) | 2 | 10 |
| 303 (SW-C) | 2 | 5 |
| 304 (SW-D) | 1 | 30 |
| 301 (SW-A) | 1 | 25 |

It should be noted that a switch device may include any number of ports and a network topology may include any number of switch devices. The embodiments herein are therefore not restricted to any number of ports (MFSP ports or access ports) or any number switch devices or any number of host nodes or devices connected to the switch devices.

Depending on the type of data frame received by a switch device, the actions performed by the switch device may be different. In the following, the type of frames considered are a broadcast frame, a known-unicast frame and an unknown-uncast frame. Further, an end-to-end process of communication between two hosts is explained in detailed, for instance Host-X and Host-Y.

Part-1: Broadcast Frames

Step 1: Assuming the source host device or node Host-X wants to communication with a destination host device or node Host-Y.

1a) Host-X generates a data frame, e.g., a standard ARP request in order to retrieve the MAC address of Host-Y:

An example of the ARP request is shown below:

| L2 | | | |
|---|---|---|---|
| Destination MAC | Source MAC | L3 | FCS |
| FF:FF:FF:FF:FF:FF | XX:XX:XX:XX:XX:XX | | X |

The ARP request is a frame which includes:
A standard broadcast MAC address in the destination MAC address field of the frame (48-bit set to 1 which in hexadecimal is given as FF:FF:FF:FF:FF:FF) in the L2 part of the frame
A known-source MAC address of the sender host or source host device Host-X in the L2 part of the frame
A known-Source IP address of the source host (not shown)
A known-Destination IP address of destination host (not shown)

The frame also includes the FCS (Frame Check Sequence).

1 b) Host-X sends the frame to its directly connected switch device SW-A 301, which may be viewed as a source switch device.

Step 2: SW-A 301 Receives the Frame from Host-X

A standard procedure of MAC address learning is performed in SW-A 301 which looks-up the source MAC address indicated in the received frame (e.g. XX:XX:XX:XX:XX:XX) to check if the MAC address table includes this MAC address. If there is no entry in the MAC address table, SW-A 301 is configured to insert or include the source MAC address in the MAC table and also indicate in the MAC table the port number through which the frame arrived at SW-A 301, which is port 8. The updated MAC-table of SW-A 301 is presented below:

| SW-A MAC address Table | |
|---|---|
| Port | MAC Address |
| 8 | XX:XX:XX:XX:XX:XX |

Step 3: Making a Decision if the Frame should be Forwarded, Flooded, or Discarded:

SW-A 301 checks the destination MAC address field and since this is a broadcast address of a broadcast frame, a standard switch device should flood the frame on all its ports except on the port from which the frame arrived (i.e., port 8). However, and according to an embodiment herein, SW-A 301 performs the following:

3a) SW-A 301 generates separate copies of the broadcast data frame, one data frame for each switch device indicated in the routing table R-table of SW-A 301. Hence, one frame for SW-B 302, one frame for SW-C 303, one frame for SW-D 304 and one frame for SW-E 305. SW-A 301 tries to deliver each frame as a unicast frame to each switch device. In this process, SW-A 301 is configured to modify the destination MAC address of each generated data frame by including in a first part of the destination MAC address an indicator value (which is denoted here a MFSP indicator). The new structure is shown below:

| MFSP Customized Destination MAC Address Field 48-bit | | | |
|---|---|---|---|
| First part | Second part | | |
| | 4-bit | 9-bit | 6-bit |
| MFSP Indicator | free | flag "0-15" | SW-ID "0-511" | TTL "0-63" |

Before explanation of this new structure, a standard MAC address structure is described. A standard MAC address is a unique 48-bit data which is divided into two 24-bit parts. The first 24-bit part is a unique ID assigned by IEEE to each manufacture of NIC (Network Interface Controller). It is known as OUI (Organizationally Unique Identifier). The second 24-bit part is assigned by each vendor internally. This part is vendor locally significant. A combination of these two 24-bit parts make the MAC address unique.

There are some specific MAC address ranges which are not assigned to any valid NICs. These are unassigned by IEEE. It means there is no standard NIC in the world having a MAC address with those bits. Hence, at least one of these unassigned MAC address ranges may be used. By doing this, when a MFSP switch device receives a frame having such specific bits/numbers, the MFSP switch device knows this is an MFSP modified frame which should be process differently.

As an example, there are 4 ranges of Locally Administered Address Ranges that can be used on a local network and it is assured that there is no other NIC from registered vendors having the same entry. An example of these ranges are presented below:

x2-xx-xx-xx-xx-xx
x6-xx-xx-xx-xx-xx
xA-xx-xx-xx-xx-xx
xE-xx-xx-xx-xx-xx

The second part of the MAC address depicted above may be divided using the method according to embodiments herein as follows:
- a 4-bit flag: By using this, more information can be provided to the MFSP switch. For instance, indicating the type of the frame, e.g., if the frame is a broadcast frame or a multicast frame, etc. As an example, "F" for broadcast, "0" for Multicast and "1" for unicast.
- 9-bit field: These are used to indicate the destination SW-ID. As previously described, the SW-ID of a switch device is a unique identification number in the whole network domain. This 9-bit field may address more than 500 switch devices in a L2 domain.
- 6-bit field: This is used for the TTL value (Time-To-Live) and is designed to control the frame for any unexpected loop scenario when the frame is modified to a MFSP frame according to embodiments herein. This field may be set to 16 (or any other suitable value) and is decreased by a predetermined number by a transit switch device. If a switch device receives a frame indicating a TTL value of 0, the frame is discarded.

As previously described, SW-A 301 generates separate copies of the broadcast data frame. Each frame destined to a switch device. The frames are differentiated by the SW-ID. Note that the L3 part also includes information which is not shown. Below are examples of the four copies:

| Frame for SW-B 302 | | | | | | |
|---|---|---|---|---|---|---|
| L2 | | | | | | |
| Destination MAC | | | | | | |
| MFSP Indicator | flag | SW-ID | TTL | Source MAC | L3 | FCS |
| | F | SW-B | 16 | XX:XX:XX:XX:XX:XX | | New-X |

| Frame for SW-C 303 | | | | | | |
|---|---|---|---|---|---|---|
| L2 | | | | | | |
| Destination MAC | | | | | | |
| MFSP Indicator | flag | SW-ID | TTL | Source MAC | L3 | FCS |
| | F | SW-C | 16 | XX:XX:XX:XX:XX:XX | | New-X |

| Frame for SW-D 304 | | | | | | |
|---|---|---|---|---|---|---|
| L2 | | | | | | |
| Destination MAC | | | | | | |
| MFSP Indicator | flag | SW-ID | TTL | Source MAC | L3 | FCS |
| | F | SW-D | 16 | XX:XX:XX:XX:XX:XX | | New-X |

| Frame for SW-E 305 | | | | | | |
|---|---|---|---|---|---|---|
| L2 | | | | | | |
| Destination MAC | | | | | | |
| MFSP Indicator | flag | SW-ID | TTL | Source MAC | L3 | FCS |
| | F | SW-E | 16 | XX:XX:XX:XX:XX:XX | | New-X |

The above frames are of standardized size. The FCS need to be recalculated as will be explained.

3b) After SW-A 301 generates the frames which are modified as previously described, the frames are ready to be sent out towards the destination. As previously described, the destination MAC address of each generated frame is modified by including in the first part of destination MAC address an indicator value (e.g., MFSP indicator) and for each switch device indicated in the routing table of SW-A 301, the SW-ID of the corresponding switch device is included in the second part of the MAC address.

For each frame and based on the routing table of SW-A 301 and the cost indicated in the routing table, SW-A 301 determines what is the best path for a destination having a SW-ID. For example, for the frame destined to switch device 303 with SW-ID SW-C, there are two "best" paths through port 1 and port 3 with equal cost 30.

In this case, SW-A 301 is configured to select one of these paths randomly and sends out the frame from a selected port, for example, SW-A selects port 1.

A forwarding decision for the other frames is as follows:
Frame destined to SW-B 302: Forward on port 1
Frame destined to SW-D 304: Forward on port 2
Frame destined to SW-E 305: Forward on port 3

Step 4: Next Hop Switch Device (Here a Transit Switch) Receives a Frame:

As an example, let us consider a frame destined to SW-C 303 sent out on port 1 of SW-A 301. SW-B 302 is a next hop switch device or a transit switch device. The actions performed are:

4.a) SW-B 302 receives the frame (with customized destination MAC address) which indicates that this is an MFSP frame.

4.b) SW-B 302 checks the TTL filed. If TTL=0, the frame is discarded, otherwise go to the next step which includes:

4.c) SW-B 302 checks its MAC address table for the source MAC address of the frame. It returns a miss (since the MAC address is not present) then the source MAC address is imported into the MAC address table. The new MAC address table of SW-B 302 is:

| SW-B MAC address Table | |
|---|---|
| Port | MAC Address |
| 1 | XX:XX:XX:XX:XX:XX |

4.d) SW-B determines the SW-ID part of the customized destination MAC address. SW-ID is 303. This is the SW-ID of SW-C and not of SW-B.

4.e) SW-B 302 determines from the routing table of SW-B 302 what is the best path toward SW-C 303. Based on the SW-B's routing table, the best path toward SW-C 303 is on port 2.

4.f) SW-B 302 performs the following changes to the frame before it sends it out trough port 2:
Decrease TTL by a predetermined number (e.g., from 16 to 15).
Recalculate a new FCS value for the frame;
Replace the FCS value with the recalculated FCS value; and
Send or transmit or forward the data frame towards the destination switch device (here SW-C 303).

Step 5: Next Hop Switch Device (Here, the Destination Switch) Receives the Frame:

5.a) SW-C 303 receives the frame with a customized destination MAC address which indicates this is an MFSP frame.

5.b) as previously described, if the TTL filed is equal to 0, the frame is discarded; otherwise go to the next step:

5.c) SW-C 302 checks its MAC address table for the source MAC address of the frame. It returns a miss (since not present in the MAC table). The source MAC address of the frame is then imported into the SW-C's MAC address table. The new MAC address table of SW-C 303 is as follows:

| SW-C MAC address Table | |
|---|---|
| Port | MAC Address |
| 1 | XX:XX:XX:XX:XX:XX |

5.d) SW-C 303 determines if the SW-ID part of the received customized destination MAC address is equal to the SW-ID of switch device 303. In this case it is hence SW-C 303 is the destination switch device.

5.e) SW-C 303 looks at the flag part of the frame to see what the frame is. It shows it is a broadcast frame.

5.f) SW-C 301 replaces the modified destination MAC address, i.e., the 48-bit customized MAC address of the frame with a standard broadcast MAC address, which is 48-bit of "F". After replacement, the frame is as shown below:

| L2 | | | |
|---|---|---|---|
| Destination MAC | Source MAC | L3 | FCS |
| FF:FF:FF:FF:FF:FF | XX:XX:XX:XX:XX:XX | | X |

5.g) SW-C 303 recalculates and updates the FCS value.

5.h) As it is a broadcast frame, a standard procedure is to flood the frame on all its ports except port 1 from which the frame arrived. However, according to the method herein, another rule is applied. The SW-C 303 forwards the frame only to access switch ports of the SW-C 303. As previously described, an access switch port is a port which is not connected directly to another (MFSP) switch device. SW-C 303 knows what ports are connected to a MFSP switch device, according to the routing table of SW-C 303. Hence, the frame is only sent to the access port towards Host-Y. Note that only a single access port (port 8) is shown in FIG. 3. However, a switch device may include any suitable number of access ports. If other host devices are connected to SW-C 303 though an access port, they will receive the frame, but these host devices will discard the frame after checking at the upper layer (L3) of the frame which indicates the destination IP address.

It should be noted that when a source switch device, e.g., SW-A 301, creates/generates a customized broadcast frame to send to a destination switch device (SW-C 303), the transit switch devices (e.g., SW-B 302) just forward the frame toward the destination switch device by sending the frame to the next switch device based on its routing table. None of the transit switch devices flood the frame. Only the destination SW-C 303 floods the frame through all non-MFSP ports, provided the SW-ID indicated in the received frame corresponds to the SW-ID of the destination switch device.

Part-2: Known-Unicast Frames

In the following, a procedure according to an embodiment herein is described wherein the frame is a known-unicast data frame. For simplicity, we consider the case where Host-Y wants to reply to Host-X. This is since Host-Y already has learned the MAC address of Host-X after receiving the frame from Host-Y.

Step 6: Destination Host Reply to the Source Host

Host-Y generates a unicast frame and sends it directly to SW-C 303. An example of a frame is shown below:

| L2 | | | |
|---|---|---|---|
| Destination MAC | Source MAC | L3 | FCS |
| XX:XX:XX:XX:XX:XX | YY:YY:YY:YY:YY:YY | | X |

Step 7: Directly Connected Switch to the Host Receives the Frame 7.a) SW-C 303 checks its MAC address table to find out if the source MAC address of the frame is present in the MAC address table. It returns a miss. So, SW-C updates its MAC table as follow by adding Host-Y's MAC address:

| SW-C MAC address Table | |
|---|---|
| Port | MAC Address |
| 1 | XX:XX:XX:XX:XX:XX |
| 8 | YY:YY:YY:YY:YY:YY |

7.b) SW-C 303 checks its MAC address table for the destination MAC address of the frame. It returns a hit, i.e., the MAC address is present in the MAC table. This also means that the frame is a known-unicast. SW-C 303 forwards the frame only on port 1 (best port towards SW-B 302) with no change.

Step 8: Next Hop Switch Device (Transit Switch Device) Receives the Frame 8.a) SW-B 302 receives this frame at port 2. SW-B 302 checks its MAC address table for the source MAC address of the frame. It returns a miss. So, SW-B 302 updates its MAC table as follows by adding Host-Y's MAC address:

| SW-B MAC address Table | |
|---|---|
| Port | MAC Address |
| 1 | XX:XX:XX:XX:XX:XX |
| 2 | YY:YY:YY:YY:YY:YY |

8.b) SW-B 302 checks its MAC address table for determining if the destination MAC address of the frame is present. It returns a hit which means that the frame is a known-unicast.

Step 9: Next Hop Switch Device (Destination Switch Device) Receives the Frame 9.a) When SW-A 301 receives the frame on port 1. SW-A 301 look-up its MAC address table for the source MAC address of the frame. It returns a miss. So, SW-A 301 updates its MAC table as follows by adding Host-Y's MAC address:

| SW-A MAC address Table | |
|---|---|
| Port | MAC Address |
| 8 | XX:XX:XX:XX:XX:XX |
| 1 | YY:YY:YY:YY:YY:YY |

9.b) SW-A 302 further look-up its MAC address table for the destination MAC address of the frame. It returns a hit. This means that the frame is a known-unicast. SW-A 301 is configured forwards the frame only on access port 8 with no change.

9.c) Host-X receives the frame. Host-X sees its own MAC address inside of the destination MAC address field of the frame and accepts the frame for further processing.

Part 3: Unknown-Unicast Frames

The following describes a procedure, according to an embodiment, when the frame is an unknown-unicast frame. An unknown unicast-frame is a frame when the destination MAC address of the frame is not present in a MAC address table of the switch.

Assume that Host-Y wishes to reply to the ARP or any other unicast frame to Host-X. SW-C 303 receives the frame and perform a lookup using the MAC table for the destination MAC address. This returns a hit and the SW-C 303 forwards the frame on port 1 towards SW-B.

When SW-B 302 receives the unicast frame, and performs a lookup using the destination MAC address and returns a miss, this means this is an unknown-unicast frame. This may happen if, for some reason, the MAC table of SW-B 302 has been flushed or the time limit for maintaining the MAC address expires or when the MAC table becomes full and old entries have been replaced with new entries. Regardless of the reason, the received frame is a unknown-unicast frame when received at SW-B 302.

In a standard switch procedure, SW-B 302 should flood the frame on all its ports except the port from which the frame arrived. However, according to an embodiment herein, in MFSP, the procedure is different, and SW-B 302 performs the following actions:

1) SW-B 302 floods the frame with no change on all its non-MFSP ports.

2) SW-B 302 repeats the steps of Part-1 previously described in relation to broadcast frames.

This means that SW-B 302 may generate separates copies of the frame, one (MFSP) frame for every other switch device and may modify the destination MAC address of each generated frame as previously described. However, SW-B 302 is configured to perform this selectively. This means that SW-B 302 generates frames for some of the switch devices according to a condition.

According to an embodiment, SW-B 301 selects, from the routing table, to which switch device(s) to send the data, except the switch device(s) associated with a port number indicted in the routing table as being equal to the port number of the port through which the data frame is received.

For example, SW-B 302 receives the frame from SW-C 303 and generates a new frame for SW-A 301 and SW-D 304 and not for SW-C 303 and SW-E 305. This is because the "best" path to reach SW-A 301 and SW-D 304 is from port 2 which is the port number through which the frame was received. Hence, SW-B generates two frames instead of four frames thereby reducing the broadcasting in the network.

Two generated copies of the frame with modified MAC address are shown below:

| Destined for SW-A 301 | | | | | | | |
|---|---|---|---|---|---|---|---|
| L2 | | | | | | | |
| Destination MAC | | | | | | | |
| MFSP Indicator | flag | SW-ID | TTL | Source MAC | L3 | FCS | |
| | 1 | SW-A | 16 | YY:YY:YY:YY:YY:YY | | New-X | |

| Destined for SW-D 304 | | | | | | | |
|---|---|---|---|---|---|---|---|
| L2 | | | | | | | |
| Destination MAC | | | | | | | |
| MFSP Indicator | Reserved | SW-ID | TTL | Source MAC | L3 | FCS | |
| | 1 | SW-D | 16 | YY:YY:YY:YY:YY:YY | | New-X | |

The flag can be set either to "F" or "1". Let us assume it is set to "1".

As previously described, the destination MAC address of each generated frame is modified by including in the first part of the destination MAC address an indicator value and based on the routing table of the SW-B 302 and the cost indicated in the routing table, and each modified data frame is transmitted towards the switch device having the SW-ID indicated in the second part of the destination MAC address. Hence, SW-A 301 and SW-D 304 each receive a modified frame. The procedure performed by the switch device include:

1) SW-A 301 and SW-D 304 knows using the first part of the MAC address that the frame is a MFSP frame.
2) If SW-A 301 (or SW-D 304) sees its own SW-ID in the received frame, SW-A 301 (or SW-D 304) checks the TTL field and if the TTL field is equal to zero the frame is discarded.
3) The flag indicated in the frame shows it is an unknown-unicast frame. Hence, the switch device processes the frame as it does with a broadcast frame i.e.:
   a) The switch device replaces the modified destination MAC address of the frame with a standard broadcast address which is FF:FF:FF:FF:FF:FF;
   b) The switch device recalculates the FCS into a new FCS, and calculates and replaces the FCS value with the recalculated FCS value; and
   c) The switch device sends out the frame to all its none MFSP ports. The switch device hence sends the data frame only to access switch ports.

The frame is as shown below:

| L2 | | | |
|---|---|---|---|
| Destination MAC | Source MAC | L3 | FCS |
| FF:FF:FF:FF:FF:FF | YY:YY:YY:YY:YY:YY | | New-X |

All host nodes that are connected to SW-A 301 and SW-D 304 receive the frame. Since this is a broadcast frame, the host devices accept it and look at the upper layer (layer 3) to determine if the frame belongs to them using the IP address. In this case, only Host-X accepts the frame as it sees its own IP address as the destination IP address. Other host nodes discard the frame.

It should be mentioned that if the SW-ID in the received data frame is different from the SW-ID assigned to the selected switch device (here SW-A and SW-D), the switch device determines from the routing table, the port number associated with the destination switch device and decreases the TTL field value by a predetermined number as previously described.

It should be mentioned that if a switch device receives a frame from an MFSP port (i.e., from another switch device) and the source MAC address indicated in the frame is already in the MAC address table and points to a non-MFSP port (access port), the switch device discards the frame.

According to an example, assume that Host-X wishes to send another ARP request (broadcast frame) to Host-Z connected to SW-D. SW-A, being a MFSP switch device, should send this broadcast frame to all other switches including SW-C. But since SW-A has two different paths with equal cost to SW-C, SW-A may use the second path which is on port 3. So, SW-A may perform load balancing by selecting at each time on which port to send the frame out.

When SW-C receives a frame with a source MAC address of Host-X but on port 3, a standard procedure of switching includes that SW-C can keep one entry for each MAC address and if the switch device sees the same MAC address on another port, the MAC address may be updated with a new entry. But unlike this standard method, the MFSP method may keep more than one entry for each MAC address. So, the next time SW-C receives a frame toward Host-X, SW-C may employ load balancing among all possible ports to forward the frame. Each switch device, based on the MFSP configuration, can keep one or more entries for a single host in its MAC address table.

Figure 4:
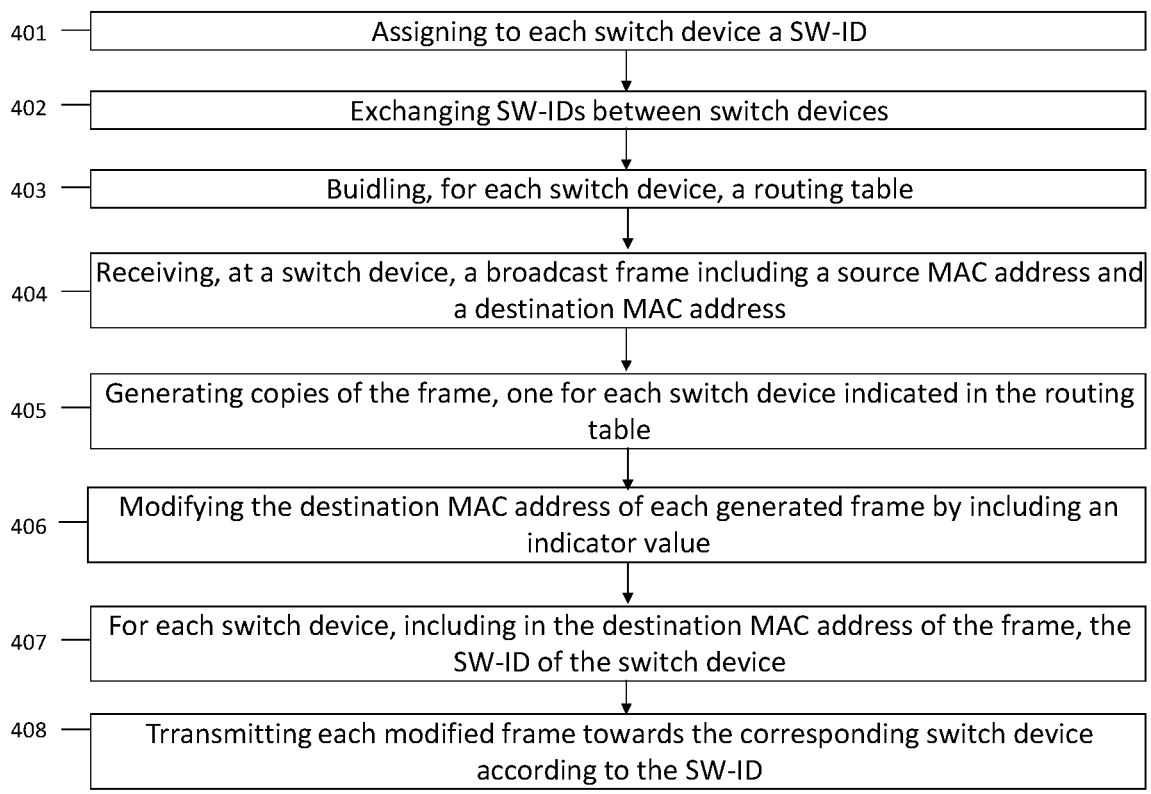
FIG. 4 illustrates a flowchart of a method according to some embodiments herein.

FIG. 4 illustrates a flowchart of a method according to embodiments herein, for switching data frames in a network comprising a plurality of switch devices. The method comprises:

(401) assigning, to each switch device, a unique switch-identification information, SW-ID;

(402) exchanging each SW-ID between all switch devices;

(403) building, for each switch device, a routing table based on said received SW-IDs, so that switch devices can reach each other; wherein each entry in the routing table includes an assigned SW-ID of a switch device, a dedicated port number and a cost to reach the switch device;

(404) receiving at a source switch device, a data frame, from a source host device connected to the source switch device, wherein the data frame includes a source MAC address of the source host device and a destination MAC address. If the data frame is a broadcast frame:

(405) generating separate copies of the broadcast data frame, one data frame for each switch device indicated in the routing table;

(406) modifying the destination MAC address of each generated data frame by including in a first part of the destination MAC address an indicator value. For each switch device indicated in the routing table, (407) including in a second part of the destination MAC address, the SW-ID of the corresponding switch device; and based on the routing table of the source switch device and the cost indicated in the routing table, (408) transmitting or forwarding each modified data frame towards the switch device having the SW-ID indicated in the second part of the destination MAC address.

As previously described and according to an embodiment, the second part of the destination MAC address further comprises a flag indicting the type of the received data frame and further comprises a TTL field value.

According to an embodiment, the method further comprises recalculating a FCS (Frame Check Sequence) of each modified data frame.

According to an embodiment, when a modified data frame is received by a switch device, checking if an indicator value included in the destination MAC address of the received frame, the method comprises checking the TTL field value in the received data frame; and if the TTL field value is equal to zero, discarding the received data frame; otherwise, if the TTL field value differs from zero, checking if the SW-ID in the received data frame is different from the SW-ID assigned to the switch device and that being the case, determining from the routing table of the switch device, the port number associated with the destination switch device; decreasing the TTL filed value by a predetermined number; recalculating the FCS; replacing the FCS value of the data frame with the recalculated FCS; and transmitting the data frame towards the destination switch device.

According to an embodiment, the method comprises: when the data frame is received at the destination switch device with an assigned SW-ID equal to the SW-ID indicated in the data frame; replacing the modified destination MAC address with a standard broadcast MAC address; recalculating and updating the FCS; and forwarding the data frame only to access switch ports of the destination switch device.

According to an embodiment, if a switch device receives a unicast data frame through a port of the switch device having a port number, and if a destination MAC address in the received data frame is not present in a MAC address table of the switch device; selecting, from the routing table, to which switch devices to send the data frame, except to the switch devices associated with a port number indicated in the routing table as being equal to the port number of the port through which the data frame was received; generating separate copies of the data frames, one data frame for each selected switch device; modifying the destination MAC address of each generated data frame by including in a first part of the destination MAC address an indicator value; including in a second part of the destination MAC address, the SW-ID of the corresponding selected switch device; and based on the routing table of the switch device and the cost indicated in the routing table, transmitting each modified data frame towards the switch device having the SW-ID indicated in the second part of the destination MAC address.

The method further comprises: receiving the modified data frame at a selected switch device. If the SW-ID assigned to the selected switch device is equal to the SW-ID indicated in the data frame; checking a TTL field value in the received data frame; and if the TTL field value is equal zero, discarding the received data frame; otherwise; if the TTL field value differs from zero, replacing the modified destination MAC address with a standard broadcast MAC address; recalculating the FCS; replacing the FCS value of the data frame with the recalculated FCS; and transmitting the data frame only to access switch ports of the switch device. If the SW-ID in the received data frame is different from the SW-ID assigned to the selected switch device, determining from the routing table of the selected switch device the port number associated with the destination switch device; decreasing the TTL filed value by a predetermined number; recalculating the FCS; replacing the FCS value of the data frame with the recalculated FCS; and transmitting the data frame towards the destination switch device.

There is also provided a system for switching data frames in a network comprising a plurality of switch devices. The system being configured to:

assign, to each switch device, a unique switch-identification number, SW-ID;

exchange each SW-ID between all switch devices;

build, for each switch device, a routing table based on said received SW-IDs, so that switch devices can reach each other; wherein each entry in the routing table includes an assigned SW-ID of a switch device, a dedicated port number and a cost to reach the switch device;

receive at a source switch device, a data frame, from a source host device connected to the source switch device, wherein the data frame includes a source MAC address of the source host device and a destination MAC address. if the data frame is a broadcast frame: generate separate copies of the broadcast data frame, one data frame for each switch device indicated in the routing table; modify the destination MAC address of each generated data frame by including in a first part of the destination MAC address an indicator value. For each switch device indicated in the routing table, include in a second part of the destination MAC address, the SW-ID of the corresponding switch device; and based on the routing table of the source switch device and the cost indicated in the routing table, transmit each modified data frame towards the switch device having the SW-ID indicated in the second part of the destination MAC address.

As previously described, the second part of the destination MAC address further comprises a flag indicating the type of the received data frame and further comprises a Time-To-Live TTL field value. According to an embodiment, a FCS of each modified data frame is calculated.

According to an embodiment, when a modified data frame is received by another switch device: if an indicator value is included in the destination MAC address of the received data frame, the system is configured to check the TTL field value in the received data frame; and if the TTL field value is equal zero, discard the received data frame; otherwise, if the TTL field value differs from zero, and if the SW-ID in the received data frame is different from the SW-ID assigned to the switch device, the system determines from the routing table of the switch device, the port number associated with the destination switch device; decreases the TTL filed value by a predetermined number; recalculates the FCS; replaces the FCS value of the data frame with the recalculated FCS; and transmits the data frame towards the destination switch device.

According to an embodiment of the system, when the data frame is received at the destination switch device with an assigned SW-ID equal to the SW-ID indicated in the data frame; is configured to replace the modified destination MAC address with a standard broadcast MAC address; recalculate and update the FCS; and forward the data frame only to access switch ports of the destination switch device. If a switch device receives a unicast data frame through a port of the switch device having a port number, and if a destination MAC address in the received data frame is not present in a MAC address table of the switch device, the system selects, from the routing table, to which switch devices to send the data frame, except to the switch devices associated with a port number indicated in the routing table as being equal to the port number of the port through which the data frame was received; generates separate copies of the data frames, one data frame for each selected switch device; modifies the destination MAC address of each generated data frame by including in a first part of the destination MAC address an indicator value; including in a second part of the destination MAC address, the SW-ID of the corresponding selected switch device; and based on the routing table of the switch device and the cost indicated in the routing table, transmits each modified data frame towards the switch device having the SW-ID indicated in the second part of the destination MAC address.

According to an embodiment, the system receives the modified data frame at a selected switch device. If the SW-ID assigned to the selected switch device is equal to the SW-ID indicated in the data frame; the system checks a TTL field value in the received data frame; and if the TTL field value is equal zero, discards the received data frame; otherwise; if the TTL field value differs from zero, the system replaces the modified destination MAC address with a standard broadcast MAC address; recalculates the FCS; replaces the FCS value of the data frame with the recalculated FCS; and transmits the data frame only to access switch ports of the switch device.

According to an embodiment, if the SW-ID in the received data frame is different from the SW-ID assigned to the selected switch device, the system determines from the routing table of the selected switch device the port number associated with the destination switch device; decreases the TTL filed value by a predetermined number; recalculates the FCS; replaces the FCS value of the data frame with the recalculated FCS; and transmits the data frame towards the destination switch device.

Several advantages are achieved by the embodiments disclosed herein. The advantages includes the following:
Unlike STPs all the links are up and operational. It means using all the capacity of the network in terms of bandwidth.
Unlike TRILL, the method (MFSP) doesn't use any additional header or field in the frame. In other words, the frame structure and the size of the frame is the same as in a standard frame.
The "Freezing Period" is avoided.
The frames use the best path to reach to a destination from a source.
Unlike STP, equal load balancing in the network is achieved.
The method is applicable is any type of network, and manual configuration is not required.

TRILL encapsulates the original frame in its own header and makes a tunnel between a source switch and a destination switch. Even if a source host has the MAC address of the destination host in its ARP table, TRILL still needs to perform a look up operation to find out the ID of a destination switch that serves destination MAC address. But in the method (MFSP) there is no need for such a look-up operation.

According to another aspect of the present disclosure, there is also provided a source switch device comprising a processor and a memory, said memory containing instructions executable by said processor whereby said source switch device is operative to perform any of the embodiments disclosed herein.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any fixed or wireless systems including GSM, 3G or WCDMA, LTE or 4G, LTE-A (or LTE-Advanced), 5G, WiMAX, WiFi.

The invention claimed is:
1. A method for switching data frames in a network comprising a plurality of switch devices, the method comprising:
assigning, to each switch device, a unique switch-identification number, SW-ID;
exchanging each SW-ID between all switch devices;
building, for each switch device, a routing table based on said received SW-IDs, so that the switch devices can reach each other, wherein each entry in the routing table includes an assigned SW-ID of a switch device, a dedicated port number, and a cost to reach the switch device;
receiving, at a source switch device, a data frame, from a source host device connected to the source switch device, wherein the data frame includes a source Medium Access Control, MAC, address of the source host device and a destination MAC address;
if the data frame is a broadcast frame:
generating separate copies of the broadcast data frame, one data frame for each switch device indicated in the routing table;
modifying the destination MAC address of each generated data frame by including in a first part of the destination MAC address an indicator value;
for each switch device indicated in the routing table, including, in a second part of the destination MAC address, the SW-ID of the corresponding switch device;
recalculating a Frame Check Sequence (FCS) of each modified data frame; and
based on the routing table of the source switch device and the cost indicated in the routing table, transmitting each modified data frame towards the switch device having the SW-ID indicated in the second part of the destination MAC address; and
when the data frame is received at a destination switch device with an assigned SW-ID equal to the SW-ID indicated in the data frame:
replacing the modified destination MAC address with a standard broadcast MAC address;
recalculating and updating the FCS; and
forwarding the data frame only to access switch ports of the destination switch device.

2. The method according to claim 1, wherein the second part of the destination MAC address further comprises a flag indicating the type of the received data frame and further comprises a Time-To-Live, TTL, field value.

3. The method according to claim 1, wherein when a modified data frame according to claim 1 is received by another switch device, the method further comprising:
if an indicator value is included in the destination MAC address of the received data frame:
checking the TTL field value in the received data frame;
if the TTL field value is equal to zero, discarding the received data frame;
if the TTL field value differs from zero,
if the SW-ID in the received data frame is different from the SW-ID assigned to the switch device, determining from the routing table of the switch device, the port number associated with the destination switch device;
decreasing the TTL filed value by a predetermined number;
recalculating the FCS;
replacing the FCS value of the data frame with the recalculated FCS; and
transmitting the data frame towards the destination switch device.

4. The method according to claim 1, further comprising:
if a switch device receives a unicast data frame through a port of the switch device having a port number, and if a destination MAC address in the received data frame is not present in a MAC address table of the switch device:
selecting, from the routing table, to which switch devices to send the data frame, except to the switch devices associated with a port number indicated in the routing table as being equal to the port number of the port through which the data frame was received;
generating separate copies of the data frames, one data frame for each selected switch device;
modifying the destination MAC address of each generated data frame by including in a first part of the destination MAC address an indicator value;
including in a second part of the destination MAC address, the SW-ID of the corresponding selected switch device; and
based on the routing table of the switch device and the cost indicated in the routing table, transmitting each modified data frame towards the switch device having the SW-ID indicated in the second part of the destination MAC address.

5. The method according to claim 4, further comprising:
receiving the modified data frame at a selected switch device;
if the SW-ID assigned to the selected switch device is equal to the SW-ID indicated in the data frame,
checking a TTL field value in the received data frame;
if the TTL field value is equal to zero, discarding the received data frame;
if the TTL field value differs from zero,
replacing the modified destination MAC address with a standard broadcast MAC address;
recalculating the FCS;
replacing the FCS value of the data frame with the recalculated FCS; and
transmitting the data frame only to access switch ports of the switch device.

6. The method according to claim 5, further comprising:
if the SW-ID in the received data frame is different from the SW-ID assigned to the selected switch device,
determining from the routing table of the selected switch device the port number associated with the destination switch device;
decreasing the TTL filed value by a predetermined number;
recalculating the FCS;
replacing the FCS value of the data frame with the recalculated FCS; and
transmitting the data frame towards the destination switch device.

7. A system for switching data frames in a network comprising a plurality of switch devices, the system being configured to:
assign, to each switch device, a unique switch-identification number, SW-ID;
exchange each SW-ID between all switch devices;
build, for each switch device, a routing table based on said received SW-IDs, so that switch devices can reach each other, wherein each entry in the routing table includes an assigned SW-ID of a switch device, a dedicated port number and a cost to reach the switch device;
receive at a source switch device, a data frame, from a source host device connected to the source switch device, wherein the data frame includes a source Medium Access Control, MAC, address of the source host device and a destination MAC address;
if the data frame is a broadcast frame:
generate separate copies of the broadcast data frame, one data frame for each switch device indicated in the routing table;
modify the destination MAC address of each generated data frame by including in a first part of the destination MAC address an indicator value;
for each switch device indicated in the routing table, include in a second part of the destination MAC address, the SW-ID of the corresponding switch device, wherein a Frame Check Sequence (FCS) of each modified data frame is recalculated; and
based on the routing table of the source switch device and the cost indicated in the routing table, transmit each modified data frame towards the switch device having the SW-ID indicated in the second part of the destination MAC address; and
when the data frame is received at a destination switch device with an assigned SW-ID equal to the SW-ID indicated in the data frame, the system is further configured to:
replace the modified destination MAC address with a standard broadcast MAC address;
recalculate and update the FCS; and
forward the data frame only to access switch ports of the destination switch device.

8. The system according to claim 7, wherein the second part of the destination MAC address further comprises a flag indicating the type of the received data frame and further comprises a Time-To-Live, TTL, field value.

9. The system according to claim 7, wherein when a modified data frame is received by another switch device:
if an indicator value is included in the destination MAC address of the received data frame,
the system is configured to check the TTL field value in the received data frame and if the TTL field value is equal to zero, discard the received data frame;

if the TTL field value differs from zero,
  if the SW-ID in the received data frame is different from the SW-ID assigned to the switch device, determine from the routing table of the switch device, the port number associated with the destination switch device;
  decrease the TTL filed value by a predetermined number;
  recalculate the FCS;
  replace the FCS value of the data frame with the recalculated FCS; and
  transmit the data frame towards the destination switch device.

10. The system according to claim 7, wherein if a switch device receives a unicast data frame through a port of the switch device having a port number, and if a destination MAC address in the received data frame is not present in a MAC address table of the switch device, the system is further configured to:
  select, from the routing table, to which switch devices to send the data frame, except to the switch devices associated with a port number indicated in the routing table as being equal to the port number of the port through which the data frame was received;
  generate separate copies of the data frames, one data frame for each selected switch device;
  modify the destination MAC address of each generated data frame by including in a first part of the destination MAC address an indicator value;
  include in a second part of the destination MAC address, the SW-ID of the corresponding selected switch device; and
  based on the routing table of the switch device and the cost indicated in the routing table, transmit each modified data frame towards the switch device having the SW-ID indicated in the second part of the destination MAC address.

11. The system according to claim 10, wherein the system is further configured to:
  receive the modified data frame at a selected switch device;
  if the SW-ID assigned to the selected switch device is equal to the SW-ID indicated in the data frame, check a TTL field value in the received data frame;
  if the TTL field value is equal to zero, discard the received data frame;
  if the TTL field value differs from zero,
    replace the modified destination MAC address with a standard broadcast MAC address;
    recalculate the FCS;
    replace the FCS value of the data frame with the recalculated FCS; and
    transmit the data frame only to access switch ports of the switch device.

12. The system according to claim 11, the system further configured to:
  if the SW-ID in the received data frame is different from the SW-ID assigned to the selected switch device,
    determining from the routing table of the selected switch device the port number associated with the destination switch device;
    decreasing the TTL filed value by a predetermined number;
    recalculating the FCS;
    replacing the FCS value of the data frame with the recalculated FCS; and
    transmitting the data frame towards the destination switch device.

\* \* \* \* \*